United States Patent Office 2,795,043
Patented June 11, 1957

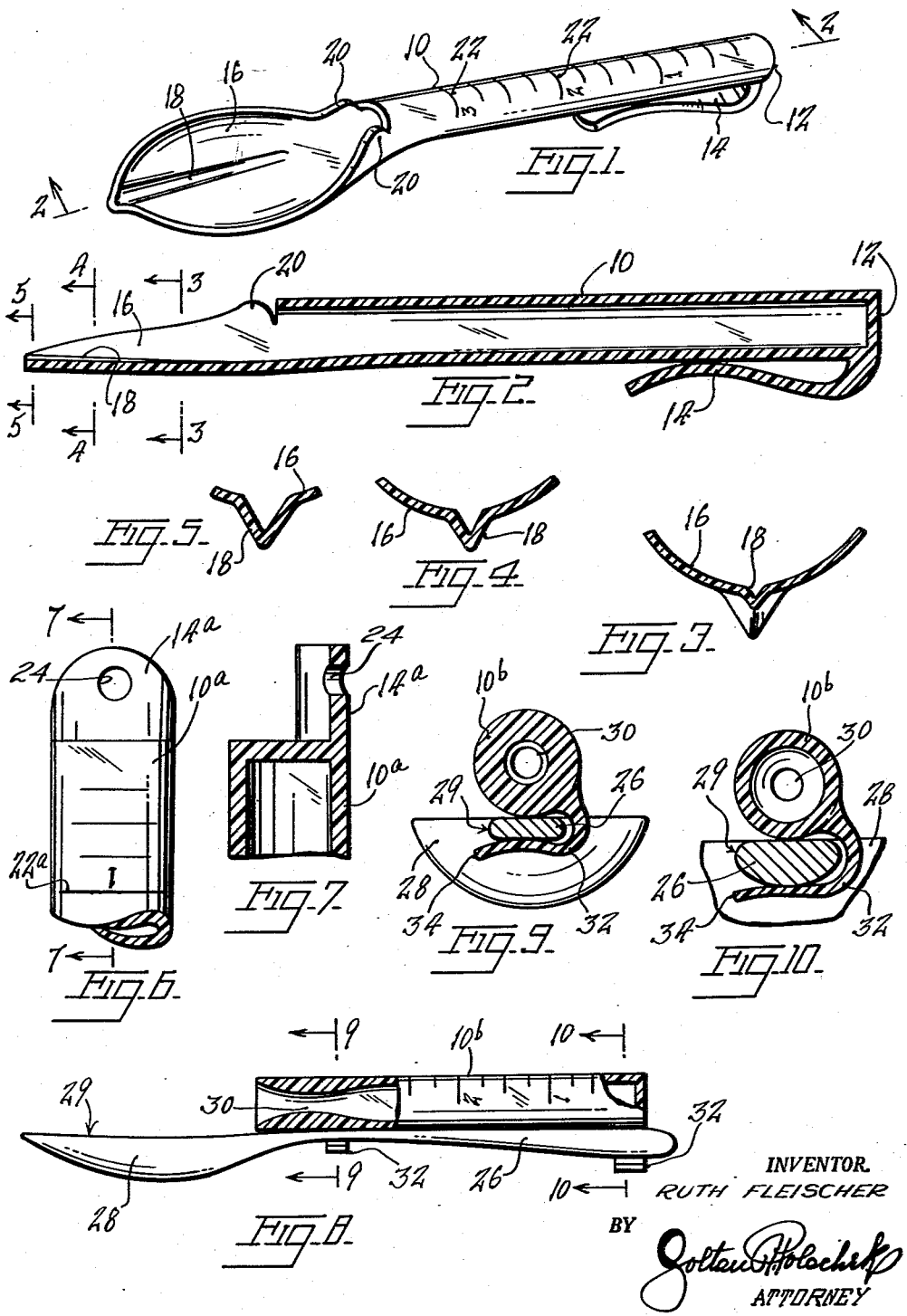

2,795,043

DEVICE FOR ADMINISTERING MEDICINE TO BE ATTACHED TO A SPOON HANDLE

Ruth Fleischer, Brooklyn, N. Y.

Application August 16, 1954, Serial No. 449,916

1 Claim. (Cl. 30—123)

This invention relates to devices to facilitate the administration of medicine to a patient, in a predetermined quantity.

In one form of the invention, the device constitutes a spoon having a bowl portion and a handle portion, the handle portion being tubularly formed. The tubular handle portion is closed at that end thereof remote from the bowl portion of the spoon, and is open at its bowl-adjacent end. In this way, medicine can be poured into the tubular portion, said portion being calibrated so as to permit a selected quantity to be deposited therein. When the medicine is to be administered to the patient, the handle portion is inclined to cause the medicine to pour into the bowl portion of the spoon.

One important object is to provide a spoon as described in which the bowl portion will have a tapering trough extending longitudinally and centrally thereof. The trough is so shaped as to increase progressively in cross sectional area in the direction of the outer end of the bowl portion, to cause the medicine to flow through the trough into the mouth of the patient. The bowl portion at opposite sides of the trough is transversely curved to cause the medicine flowing from the tubular handle into the bowl portion to be directed into the trough.

Another object of importance is to provide means, in various forms of the invention, for facilitating the attachment of the device to an associated support, whether said support be a garment, or in another instance a nail or wall-mounted hook.

Yet another object is to provide, in at least one form of the invention, means attachable to a conventional spoon that will be adapted to hold a selected quantity of medicine, said means being so shaped as to cause the medicine to pour into the bowl portion of the spoon when the spoon is held in a natural position for flowing the contents thereof into the mouth of a user.

Still another object is to provide, in the last-mentioned form of the invention, means for restricting the amount of medicine flowing out of the open end of the tubular element, so as to cause a limited quantity to flow into the bowl portion of the spoon at one time.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a perspective view of a spoon formed in accordance with the present invention.

Fig. 2 is an enlarged longitudinal sectional view on line 2—2 of Fig. 1.

Figs. 3, 4 and 5 are enlarged transverse sectional views on lines 3—3, 4—4 and 5—5, respectively, of Fig. 2.

Fig. 6 is a fragmentary front elevational view of the outer end of the modified form of spoon.

Fig. 7 is a sectional view on line 7—7 of Fig. 6.

Fig. 8 is a view partly in side elevation and partly in longitudinal section of a modified form of medicinal administering device, said device being attached to a conventional spoon shown in side elevation.

Figs. 9 and 10 are enlarged transverse sectional views on line 9—9 and 10—10, respectively, of Fig. 8.

In the form of Figs. 1–5, the spoon includes a straight, cylindrical, hollow handle 10 the outer end 12 of which is permanently closed. End 12 is flattened. This permits the device to stand on its end while being filled or while awaiting use after filling. Further, the contents can be measured accurately under these circumstances.

Integral with the handle 10, at the closed end thereof, is a compoundly curved pocket clip 14, that facilitates the attachment of the device to the garment of a nurse, doctor, or other individual charged with the responsibility of administering medicine to a patient.

In the form shown in Figs. 1–5, the hollow handle is of constant inner diameter throughout its length, and at its inner end is wholly open, to permit the unrestricted flow of the contents of the handle into the bowl portion 16 of the spoon. The bowl portion 16, as shown in Fig. 1, is formed, longitudinally and centrally thereof, with a trough 18, said trough being of V-shaped cross section, and being increased progressively in width and depth in the direction of the outer end of the bowl portion. The trough 18, at its inner end, terminates short of the inner end of the tubular handle, the outer end of the trough extending fully to the outer end of the spoon. At opposite sides of the trough, the spoon is transversely curved as best shown in Figs. 3–5, the curvature being more pronounced and the spoon increasing progressively in width in the direction of the inner end thereof. This may be readily noted by comparing Figs. 3–5 with one another.

By reason of this arrangement, the medicine flowing out of the open end of the tubular handle will be caused, by the transverse curvature of the bowl portion, to flow into the inner end of the trough 18, the medicine then flowing longitudinally and centrally of the spoon within the trough into the mouth of the patient. In this way, an excessive quantity of medicine is not caused to flow into the patient's mouth at any one time.

At the same time, it is desirable that the trough be increased progressively in width and depth in the direction of the outer end of the bowl portion. This is desirable because only in this way can assurance be provided that the trough will not overflow, causing an excessive amount of medicine to be deposited in the mouth of the patient. The progressive increase in the trough cross sectional area causes any excess medicine to be deposited in the trough, while still confining the amount taken by the patient to a relatively small quantity, at any particular time.

At its inner end, the side walls of the bowl portion 16 are increased in height, as at 20, the portions 20 constituting extensions of diametrically opposite side portions of the tubular handle, so as to in effect provide a flared outlet on the tubular handle, which will prevent overflow of the handle contents and will guide said contents properly into the bowl portion 16.

Formed upon the exterior surface of the tubular handle is a means for indicating the amount of medicine deposited therein. This means comprises uniformly spaced calibrations 22 on the handle, marked with suitable indicia. For example, in the illustrated example main calibrations can be provided, designating in each instance a teaspoonful of medicine. If it is necessary that the patient take three teaspoonfuls, the entire quantity can be deposited in the tubular handle, after which the quantity is caused to flow gradually out of the handle into the trough 18 when the medicine is being administered to the patient. The clip 14, being diametrically opposite calibrations 22, serves as a holding means during the reading of the calibrations.

In Figs. 6 and 7 a modified form is shown wherein the tubular handle 10ª is identical in all respects to the handle 10, having the calibrations 22ª similar to the calibrations 22. On the handle a bowl portion identical to that shown in Figs. 1–5 would be provided. In this form, however, instead of a pocket clip 14 there is provided a means for attaching the device to a nail or hook, not shown, mounted upon a vertical wall. This means includes a tongue 14ª which can be transversely curved as an extension of the side wall of the tubular handle. The tongue projects longitudinally of the handle, beyond the closed end thereof, and is formed with an opening 24 adapted to receive the nail or hook.

In Figs. 8–10 a second modification is illustrated, wherein the medicine administering device can be attached to a conventional spoon handle 26, said handle merging into a bowl portion 28 and constituting, with its bowl portion, a conventional spoon 29.

In this form, the tubular member 10ᵇ is closed at one end, as in the first two forms, and further, is calibrated longitudinally as in the first two forms. However, in this form, instead of being of constant inner diameter throughout its length, the tubular member 10ᵇ has, adjacent its open inner end, an interiorly thickened part forming a restricted throat 30 through which the contents must flow out of the tubular member into the spoon. The restricted throat 30 is progressively increased in diameter in the direction both of the inner and the outer ends of the bowl portion, along gradually curving lines.

The progressive increase in diameter of the throat in the direction of the open end of the tubular member provides an inclined surface over which the contents flow into the spoon, thus to assure that there will be no danger of the contents trickling irregularly out of the tubular member 10ᵇ or splashing when said contents drop into the bowl portion 28.

In this arrangement, the tubular member 10ᵇ is attached to the spoon handle 26 by clips 32. Clips 32 are spaced longitudinally of and are integral with the tubular member 10ᵇ, there being one clip at the outer, closed end of the tubular member and a second clip adjacent the open inner end of said member. The clips are identical to one another, and are of springable material, the free end portions 34 of the clips being reversely curved to facilitate the application of the spoon handle to the space between the clips and the wall of the tubular member 10ᵇ.

The clips are so shaped as to accommodate any of variously shaped spoon handles. Thus, a spoon handle may increase both in thickness and in width in the direction of its outer end. The clips 32, in this connection, extend transversely of the tubular member 10ᵇ, and are of such length as to accommodate spoon handles of various widths. In each instance, the spoon handle, when entered into the space between the clip and the wall of the tubular member, forces the clip resiliently outwardly from the tubular member. As a result, the spoon handle is gripped tightly between the wall of the tubular member and the midlength portion of the clip, as shown in both Figs. 9 and 10.

Of course, the tubular member can be removed whenever desired, to allow regular use of the spoon.

While I have illustrated and described the preferred embodiments of my invention, it is to be understood that I do not limit myself to the precise constructions herein disclosed and the right is reserved to all changes and modications coming within the scope of the invention as defined in the appended claim.

Having thus described my invention, what I claim as new, and desire to secure by United States Letters Patent is:

A device for administering medicine comprising a tubular member of uniform diameter closed at one end, the other end being open, and adapted to be connected to spoon means having a bowl portion positioned to receive a liquid flowing out of the open end of the tubular member, and a handle integral with said bowl portion, the tubular member being detachably connectible to said handle, the tubular member including transversely extending clips with open ends spaced longitudinally thereof adapted to engage about said handle to provide the detachable connection of the tubular member to the handle, said clips each being reversely curved adjacent its open end, the other ends of the clips being integrally connected to the tubular member, the clips being of springable material so as to be yieldably biased away from the tubular member responsive to the insertion of said handle between the clips and the tubular member, said tubular member having adjacent its open end a restricted throat with a curved outlet passage therethrough.

References Cited in the file of this patent

UNITED STATES PATENTS

| Number | Name | Date |
|---|---|---|
| 427,254 | Danielowsky | May 6, 1890 |
| 608,890 | Morningstar | Aug. 9, 1898 |
| 705,018 | Bechtold | July 22, 1902 |
| 783,688 | Dujat | Feb. 28, 1905 |
| 1,000,178 | Kahl | Aug. 8, 1911 |
| 1,543,209 | Fulton | June 23, 1925 |
| 1,829,671 | Ribera | Oct. 27, 1931 |
| 2,252,119 | Edmonds | Aug. 12, 1941 |
| 2,453,525 | McNeill | Nov. 9, 1948 |